United States Patent
Winkler et al.

(10) Patent No.: US 7,178,024 B2
(45) Date of Patent: Feb. 13, 2007

(54) SECURITY SERVICE FOR AN ELECTRONIC MARKETPLACE

(75) Inventors: Steven Thomas Winkler, Sunnyvale, CA (US); Michael Andreas Friedrich, Kehl (DE); Armin Risch, Union City, CA (US)

(73) Assignee: SAP AG, Walldorf (DE)

(*) Notice: Subject to any disclaimer, the term of this patent is extended or adjusted under 35 U.S.C. 154(b) by 669 days.

(21) Appl. No.: 09/826,738

(22) Filed: Apr. 5, 2001

(65) Prior Publication Data

US 2002/0147911 A1 Oct. 10, 2002

(51) Int. Cl.
*H04L 9/00* (2006.01)

(52) U.S. Cl. ............... 713/168; 713/176; 713/177; 713/180; 726/30; 726/31

(58) Field of Classification Search ......... 713/168–177
See application file for complete search history.

(56) References Cited

U.S. PATENT DOCUMENTS

| | | | |
|---|---|---|---|
| 5,157,726 A * | 10/1992 | Merkle et al. ............ 713/176 |
| 5,557,518 A | 9/1996 | Rosen | |
| 5,629,982 A | 5/1997 | Micali | |
| 5,666,420 A | 9/1997 | Micali | |
| 5,671,279 A | 9/1997 | Elgamal | |
| 5,673,316 A | 9/1997 | Auerbach et al. | |
| 5,677,955 A | 10/1997 | Doggett et al. | |
| 5,689,565 A | 11/1997 | Spies et al. | |
| 5,715,314 A | 2/1998 | Payne et al. | |
| 5,748,738 A * | 5/1998 | Bisbee et al. ............ 713/176 |
| 5,757,917 A | 5/1998 | Rose et al. | |
| 5,764,890 A * | 6/1998 | Glasser et al. ............ 713/202 |
| 5,790,677 A | 8/1998 | Fox et al. | |
| 5,794,207 A | 8/1998 | Walker et al. | |
| 5,809,144 A | 9/1998 | Sirbu et al. | |
| 5,841,870 A | 11/1998 | Fieres et al. | |
| 6,141,653 A | 10/2000 | Conklin et al. | |
| 6,154,844 A * | 11/2000 | Touboul et al. ............ 713/201 |
| 6,247,127 B1 | 6/2001 | Vandergeest | |
| 6,263,313 B1 * | 7/2001 | Milsted et al. ............ 705/1 |
| 6,289,460 B1 | 9/2001 | Hajmiragha | |
| 6,356,937 B1 | 3/2002 | Montville et al. | |
| 6,378,075 B1 | 4/2002 | Goldstein et al. | |
| 6,389,538 B1 * | 5/2002 | Gruse et al. ............ 713/194 |
| 2002/0087479 A1 | 7/2002 | Malcolm | |
| 2002/0120680 A1 * | 8/2002 | Greco et al. ............ 709/203 |

OTHER PUBLICATIONS

U.S. Appl. No. 60/264,744, filed Jan. 30, 2001.*
Doll, S., 'XML security: A who's who', CNET Networks, Inc., Jul. 8, 2002, entire document, http://techupdate.zdnet.com/techupdate/stories/main/0,14179,2873295,00.html.*
Kabat, J., Generic Security Service API Version 2: Java Bindings, ValiCert, Inc., RFC2853, Jun. 2000, pp. all.

* cited by examiner

*Primary Examiner*—Nasser Moazzami
*Assistant Examiner*—Ronald Baum
(74) *Attorney, Agent, or Firm*—Finnegan, Henderson, Farabow, Garrett & Dunner, L.L.P.

(57) ABSTRACT

A security service for an electronic marketplace that permits members of the marketplace to use any signing service to attach electronic signatures to documents resident on the marketplace regardless of format differences between the member's internal computer system and the electronic marketplace.

12 Claims, 7 Drawing Sheets

SECURITY SERVICE FOR AN ELECTRONIC MARKETPLACE

FIELD OF THE INVENTION

This invention relates to providing a generic security service for an electronic marketplace that permits members of the marketplace to use any signing service to attach electronic signatures to documents resident on the marketplace.

BACKGROUND OF THE INVENTION

Currently, business-to-business electronic marketplaces exist that are accessible to businesses through computer networks, such as the Internet. These electronic marketplaces permit members of the marketplaces to purchase and sell products to other members of the marketplace without needing to actually talk to the other member. Such marketplaces are computer systems that are generally maintained by either the members themselves, a third party, or a company for internal use between business units. These systems greatly increase the efficiency with which members can purchase and sell goods.

Because it is desirable that transactions conducted over such marketplaces are legally enforceable contracts, the use of electronic signatures is important. An electronic signature demonstrates that the document actually comes from the party it purports to be from, that the document has not been tampered with or altered, that the sender meant to send the document and that the signer accepts the terms therein. However, numerous different signing authorities currently exist, such as Verisign, Identrust, and others, and many more may arise in the future. In order to provide members of the marketplace with the ability to do business with companies of their choice that might be using any of the existing or future signing authorities, the electronic marketplace must be readily adaptable to handle those authorities.

Figure 1:
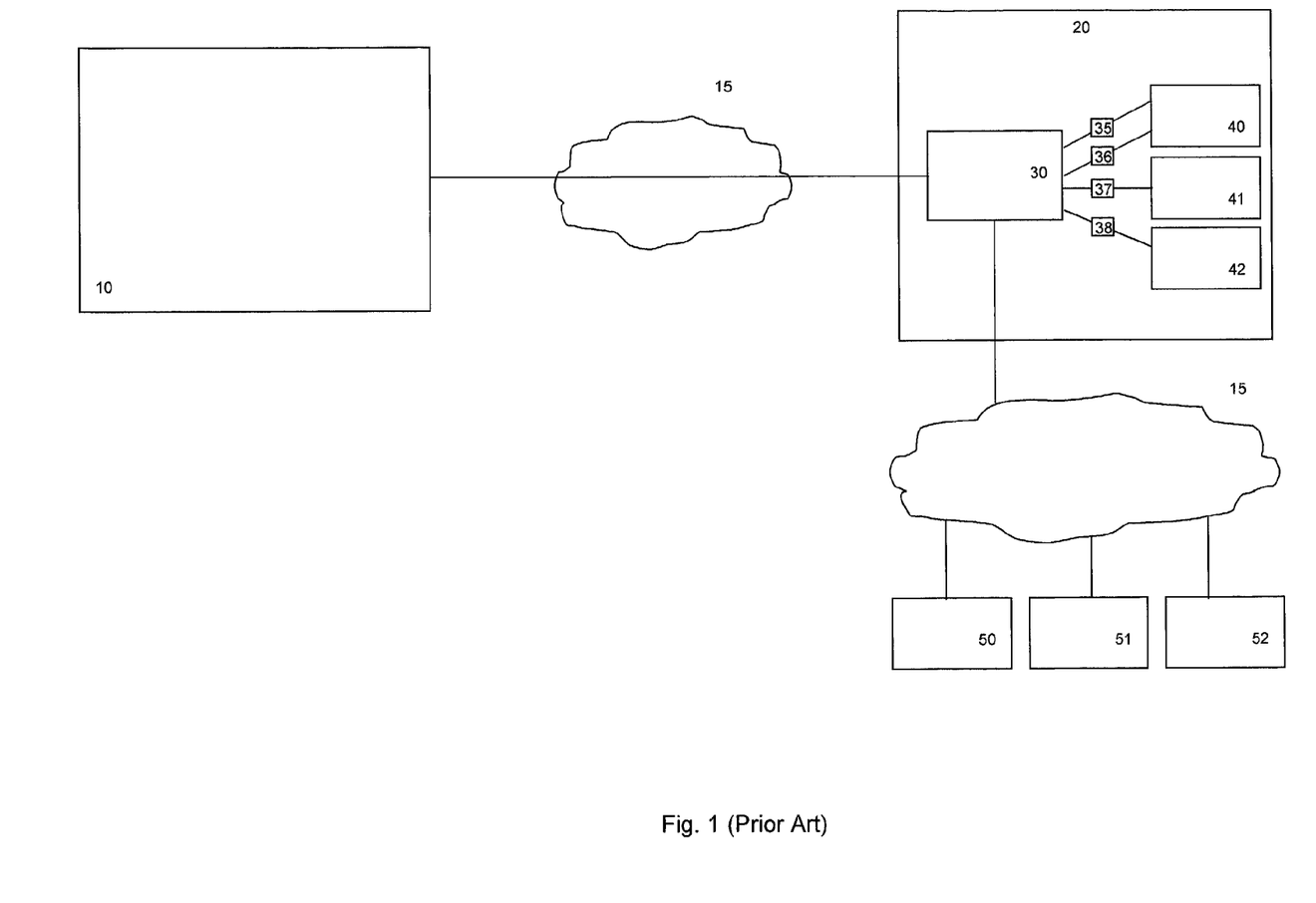
FIG. 1 (Prior Art) is a block diagram of an electronic marketplace having security applications of the prior art.

As can be seen in FIG. 1 (Prior Art), under the prior art, a member 10 would be connected into an electronic marketplace 20 through a computer link or network, such as the Internet 15. When member 10 desires to undertake an action which would require an electronic signature, for instance, authorize a payment, a service application 30 residing on the electronic marketplace 20 will call a signing service application 40, 41 or 42, depending upon which signing authority is utilized by the appropriate outside service 50, 51 or 52, which may be, for instance, a bank. Under the prior art, a custom-made interface program 35, 36, 37 or 38 is created to handle the interface with each outside service 50, 51 and 52. These custom-made interface programs 35, 36, 37 and 38 access the appropriate signing service 40, 41 or 42 that the respective outside service 50, 51 or 52 uses. These programs 35, 36, 37 and 38 must also take into account the data elements within a document that the respective outside service 50, 51, or 52 requires be signed. Even if outside services 50 and 51 were to use the same signing service 40, separate custom-made interface programs 35 and 36 would be required if the data elements that outside services 50 and 51 required to be signed were different. With the large number of different outside service providers that marketplace members may want to utilize, each having their own requirements on what data within documents needs to be signed and what security application needs to be used, the situation gets extremely complicated. Each time a member desires to access a new outside service, another custom-made interface program needs to be created, causing delay and additional expense.

Figure 2:
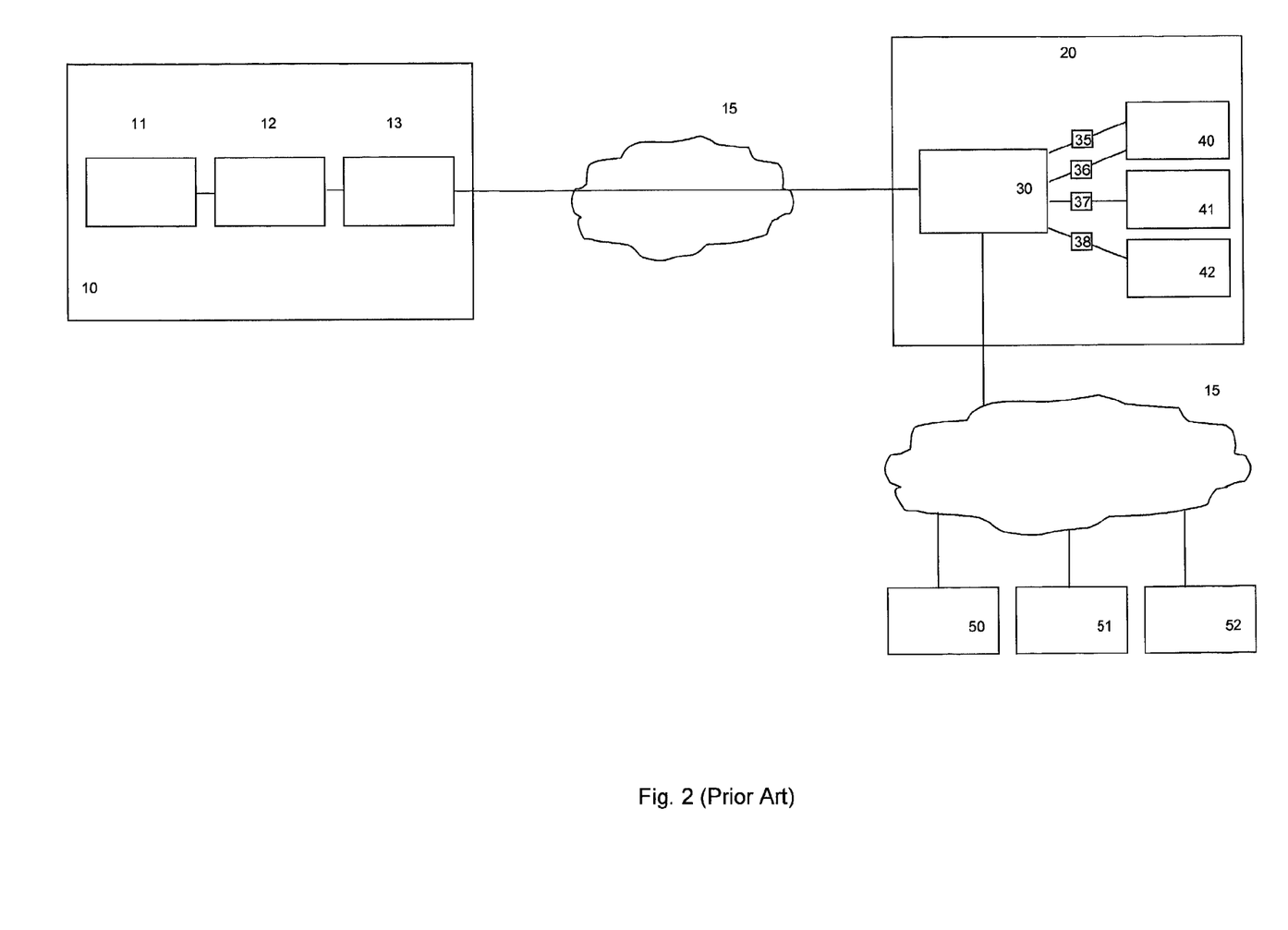
FIG. 2 (Prior Art) is a block diagram of a member of an electronic marketplace having a converting device to communicate with the electronic marketplace of the prior art.

Another prior art system is shown in FIG. 2 (Prior Art). This system utilizes a conversion device 12 to convert or map a document type from the internal format utilized in a member's internal computer system 11 into a format accepted by electronic marketplace 20. The document then travels through a firewall 13 onto Internet 15 before reaching the electronic marketplace 20. A problem exists when a document that is resident on electronic marketplace 20 needs to be signed by member 10. Because the document resident on electronic marketplace does need to be mapped, a signature that is attached prior to conversion device 12 will not be able to be validated due to changes in the data due to the mapping. In order to address this problem, some prior art systems removed member 10 from the signing process. In such systems, the signature was attached automatically by the electronic marketplace 20 itself. This does not provide the recipient of the signed document with the knowledge that the sender truly desired to send the document and agreed to be bound by its terms and thus may cause problems with enforceability of the signed document.

SUMMARY OF THE INVENTION

An embodiment of the present invention provides a generic security service for an electronic marketplace that permits a marketplace member to electronically sign documents contained within the marketplace using any signing authority.

Another embodiment of the present invention provides a security service for an electronic marketplace that permits a member to electronically sign documents residing thereon that have a different format than documents residing on the member's internal computer system.

Yet another embodiment of the present invention provides a security service for an electronic marketplace in which a member is presented with a document or a representation of a document via a browser and permits the member to sign to attach a signature thereto.

As such, it is an object of the present invention to permit an electronic marketplace member to electronically sign documents contained within the marketplace using any signing authority.

It is a further object of the present invention to permit a member of an electronic marketplace to electronically sign documents residing thereon having a different format than the format of documents existing on the member's internal computer systems.

It is yet a further object of the present invention to permit a member of an electronic marketplace to sign an electronic document or a representation thereof residing on the marketplace via a browser.

DESCRIPTION OF THE PREFERRED EMBODIMENTS

The present invention will be better understood by reference to the accompanying drawings.

Figure 3:
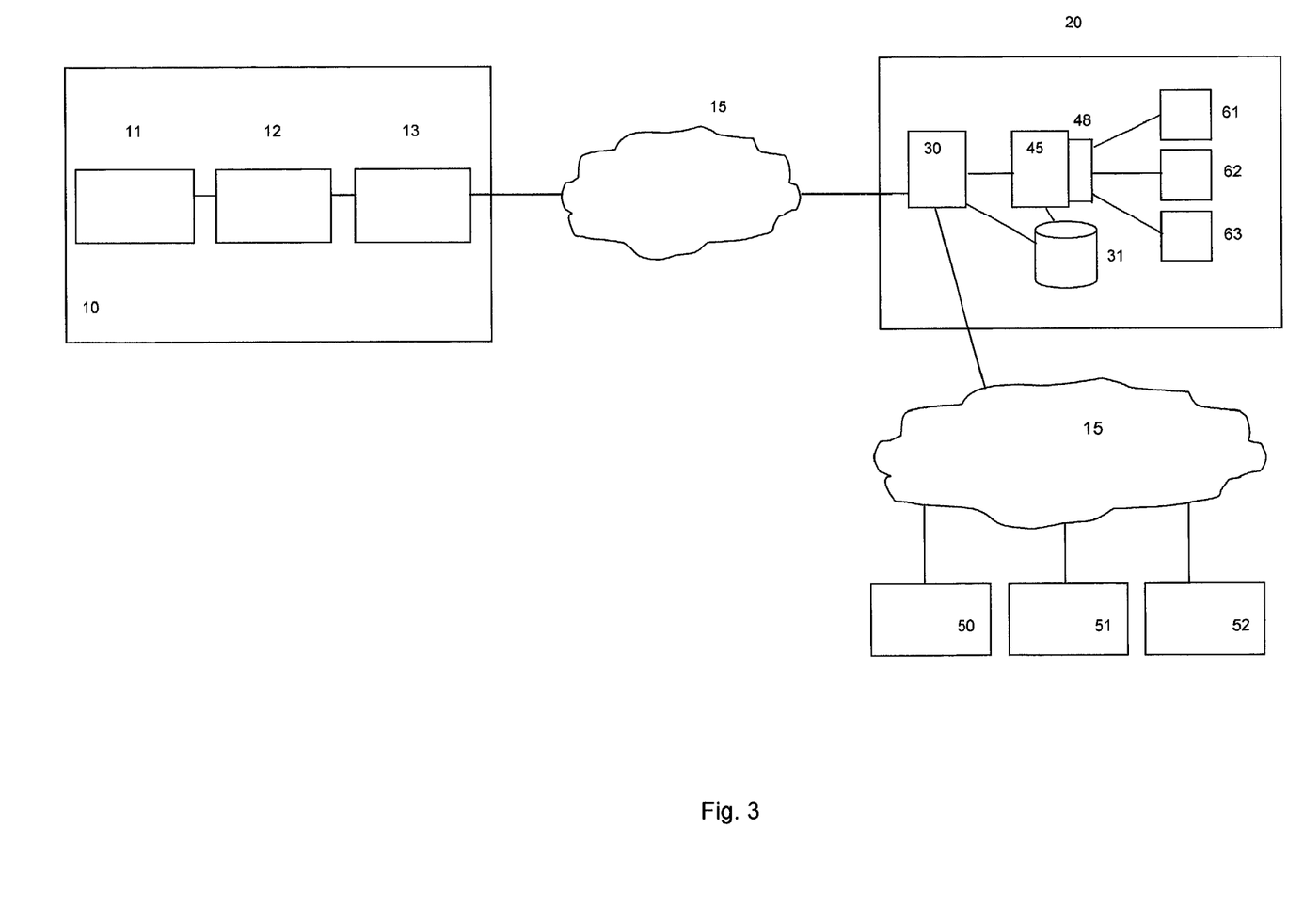
FIG. 3 is a block diagram of an electronic marketplace according to an embodiment of the present invention.

An embodiment of the present invention is depicted in FIG. 3. Referring to that figure, a member 10 of an electronic marketplace 20 is shown. As in FIG. 2, member 10 has an internal computer system 11 connected to a conversion device 12 to convert the format of the documents contained in internal computer system 11 to a format compatible with electronic marketplace 20. Internal computer system 11 is connected to electronic marketplace 20 through firewall 13 and Internet 15. While connection to electronic marketplace 20 is typically through a firewall 13 and Internet 15, the connection can alternatively be made without a firewall and may be made through other computer networks, through a dedicated line or by other means.

Electronic marketplace 20 contains various applications for use by members, such as member 10. Generic security service 45 is one such application. Another such application that may need to call generic security service 45, by way of example, may be a payment application 30. Various other applications may exist which could reside on electronic marketplace 20 that may or may not need to access generic security service 45.

Database 31 is provided for storage of documents on electronic marketplace 20 as will be discussed later.

Electronic marketplace 20 can also be connected to various outside services 50, 51 and 52, such as applications not resident on electronic marketplace 20. This connection can also be made through the Internet 15. It may alternatively be made through another computer network, a direct connection or an alternative means. Outside services 50, 51 and 52 may or may not contain firewalls. If format conversion of documents is necessary to interface with an outside service, the outside service may also have a conversion device or alternatively, documents could be converted at the electronic marketplace.

Electronic marketplace 20 also contains generic security service applications programming interface 48 which serves as an interface between generic security service 48 and various signing services 61, 62 and 63. Signing services 61, 62 and 63 could be any existing signing service or any future developed service.

Figure 4:
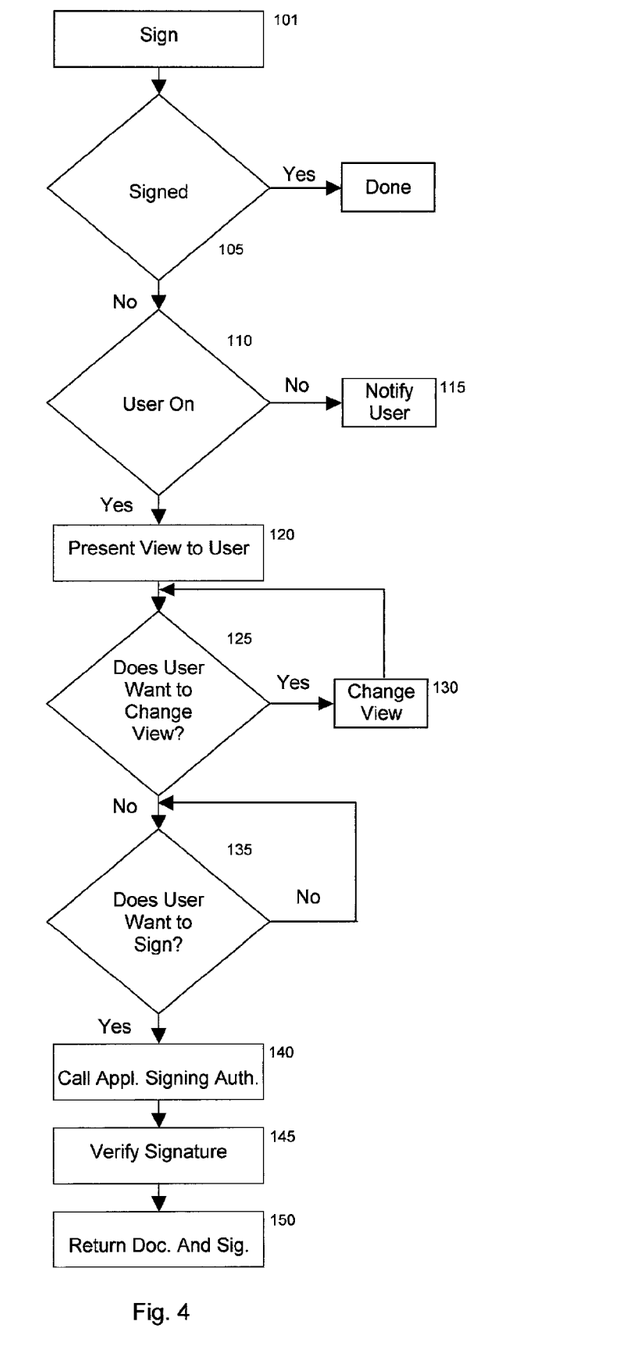
FIG. 4 is a flow chart illustrating the electronic marketplace functioning according to an embodiment of the present invention.

FIG. 4 shows a flow chart describing the operation of generic security service 45 according to an embodiment of the present invention. This generic security service 45 can be programmed in a combination of Java Servlets, JSP, and XML.

Other applications, such as payment application 30 may call generic security service 45 in step 101. Generic security service 45 may check to see if the document is already signed, as shown in step 105. If the document has already been signed, the call to the generic security service is terminated as it is not needed. While this check is not absolutely necessary, it serves to prevent multiple signings of the same document. Alternatively, if multiple signings are desired to be permitted, this step should be omitted. If the document has not yet been signed, the process proceeds to step 110. In step 110, it is determined if a user that is authorized to sign the document is logged onto the system. If the user is not logged on, a representation of the document can be stored in the user's inbox in step 115. Alternatively, an email or other message could be sent to the user indicating that the document is ready for signature.

If the member is logged onto the system, in step 120 the member is shown the document, a user-friendly representation of the document or a representation of the document to actually be signed as will be discussed hereinafter. Additionally, if the document is encrypted, it can be decrypted prior to viewing.

Electronic documents, such as those of an XML format, contain much more information than most members need and are therefore more difficult to read than a counterpart paper document. Additionally, electronic documents may not contain legal contractual language that may be required by businesses, such as banks, when handling electronic documents.

Therefore, it is preferable to provide the member with the ability to switch the view between the document itself, one or more user-friendly representations of the document and/or a representation of the document that is to actually be signed (such as one containing required contractual language) as shown in step 125. This ability to switch could be provided through a button available on the member's browser, for example. If the user indicates that he wants to switch views, the view is changed in step 130. The user-friendly representations and/or the representation that is to actually be signed could be created by a marketplace integrator as will be discussed with respect to FIG. 6 or by the intended recipient. These representations would most likely contain selected data elements from the document and may also contain additional text to make them more comprehensible or to meet contractual requirements. Templates for these layouts could be saved into database 31 for use with selected document types.

In step 135 the member indicates whether he or she wants to sign the document. This can be done through the clicking of a button on the member's browser, for example. The signature would be calculated according to the appropriate signing service that has been programmed for the outside service that the member is utilizing. The programming procedure is discussed hereinafter with respect to FIG. 6. The signature may be calculated based upon a private key assigned to the member, for example. If the member does desire to sign the document, the generic security service 45 calls the appropriate signing service 61, 62 or 63 used by the intended recipient of the document through application programming interface 48 as shown in step 140.

In step 145, generic security service 45 would preferably be able to load the signature of the member from database 31 and compare it against the signature received from the user to verify that it is a valid signature. Once this is done, in step 150, the document and signature are returned separately to the application that called generic security service 45, such as payment application 30, completing the call to generic security service 45. The calling application, such as payment application 30, can then combine the document and signature in a way that is required by the outside service.

Figure 5:
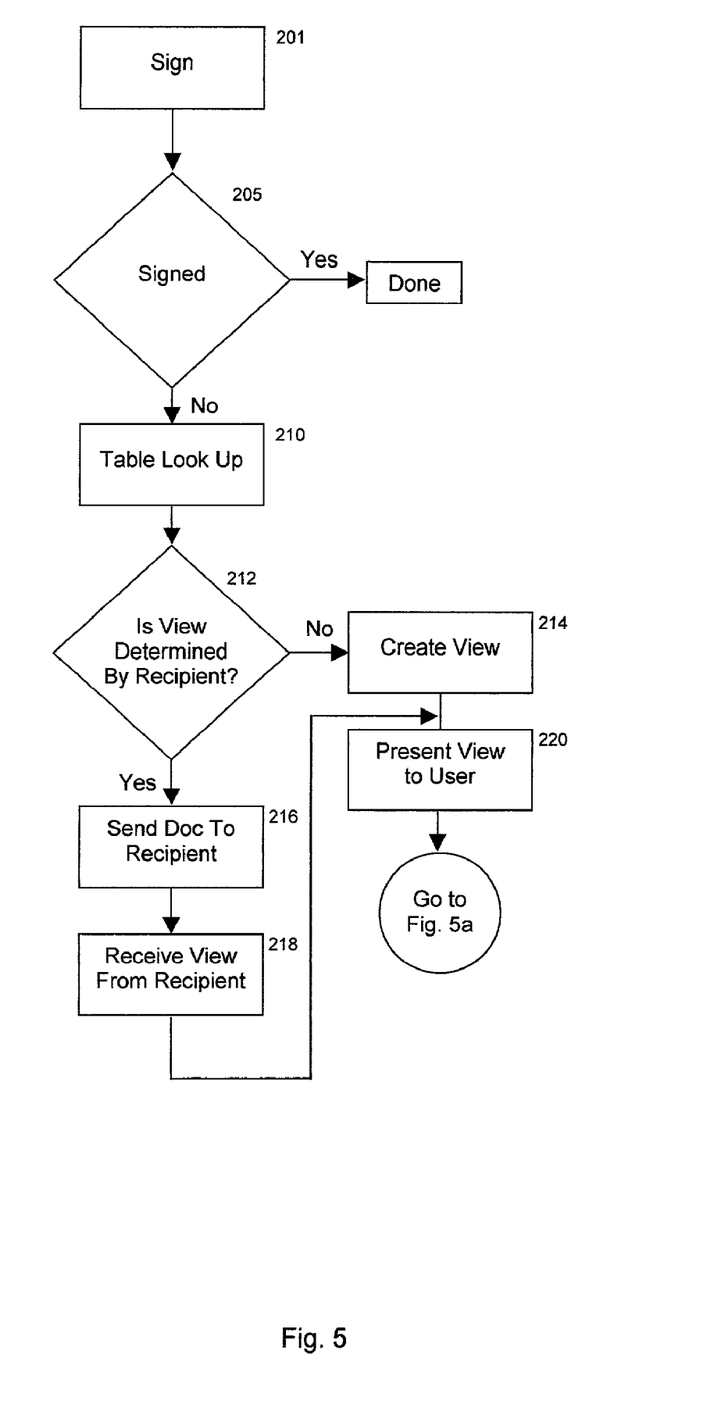
FIG. 5 is a flow chart illustrating the electronic marketplace functioning according to an embodiment of the present.
Figure 5A:
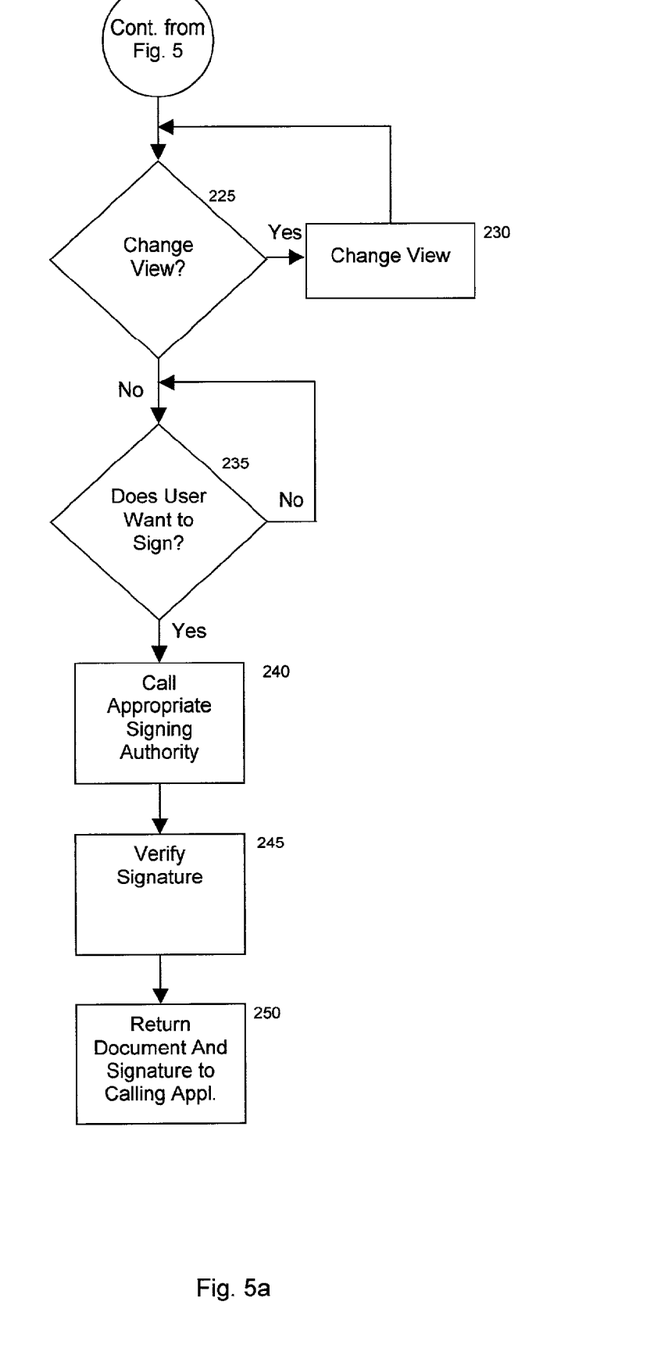
FIG. 5A is a continuation of the flow chart of FIG. 5 illustrating the electronic marketplace functioning according to an embodiment of the present invention.

FIGS. 5 and 5A show a flow chart describing the operation of generic security service 45 according to an embodiment of the present invention. In this embodiment user 10 is logged onto the system. Elements 210 through 218 of this embodiment can be incorporated into the embodiment of FIG. 4 between step 110 and step 120 if desired. This generic security service 45 can be programmed in a combination of Java Servlets, JSP, and XML.

Other applications, such as payment application 30 may call generic security service 45 in step 201. Generic security service 45 may check to see if the document is already signed, as shown in step 205. If the document has already been signed, the call to the generic security service is terminated as it is not needed. While this check is not absolutely necessary, it serves to prevent multiple signings of the same document. Alternatively, if multiple signings are desired to be permitted, this step should be omitted. If the document has not yet been signed, the process proceeds to step 210. In step 210, a table created by a marketplace integrator is accessed to determine if any of the user-friendly representation of the document or the representation of the document to actually be signed is supplied by the intended recipient, such as outside service 50, 51 or 52, or if the marketplace integrator has prepared a template, for instance an XSLT file, for the type of document that is to be signed. If the marketplace integrator has prepared a template, in step 214, that template is loaded from memory and used to create the representation of the document.

If the table indicates that the intended recipient is to create a user-friendly representation or the representation of the document to actually be signed, then the document is sent to the intended recipient so that the intended recipient can create the representation(s), as shown in step 216. In step 218, the intended recipient returns the appropriate representation(s) to electronic marketplace 20. Alternatively, a preferred representation can be returned and if the member indicates that he wishes to change views to another representation to be supplied by the intended recipient, the intended recipient could be queried and the new representation could be then provided by the intended recipient.

In step 220 the member is shown the document or the user-friendly representation of the document. In step 225, the user is permitted to switch the view between the document itself and the representation(s) of the document. This ability to switch could be provided through a button available on the member's browser, for example. If the user indicates that he wants to switch views, the view is changed in step 230.

In step 235 the member indicates whether he or she wants to sign the document. This can be done through the clicking of a button on the member's browser, for example. The signature would be calculated according to the appropriate signing service that has been programmed for the outside service that the member is utilizing. The programming procedure is discussed hereinafter with respect to FIG. 6. The signature may be calculated based upon a private key assigned to the member, for example. If the member does desire to sign the document, the generic security service 45 calls the appropriate signing service 61, 62 or 63 used by the intended recipient of the document through application programming interface 48 as shown in step 240.

In step 245, generic security service 45 would preferably be able to load the signature of the member from database 31 and compare it against the signature received from the user to verify that it is a valid signature. Once this is done, in step 250, the document and/or the representation to actually be signed and the signature are returned separately to the application that called generic security service 45, such as payment application 30, completing the call to generic security service 45. The calling application, such as payment application 30, can then combine the document and/or the representation to actually be signed with the signature in a way that is required by the outside service.

Figure 6:
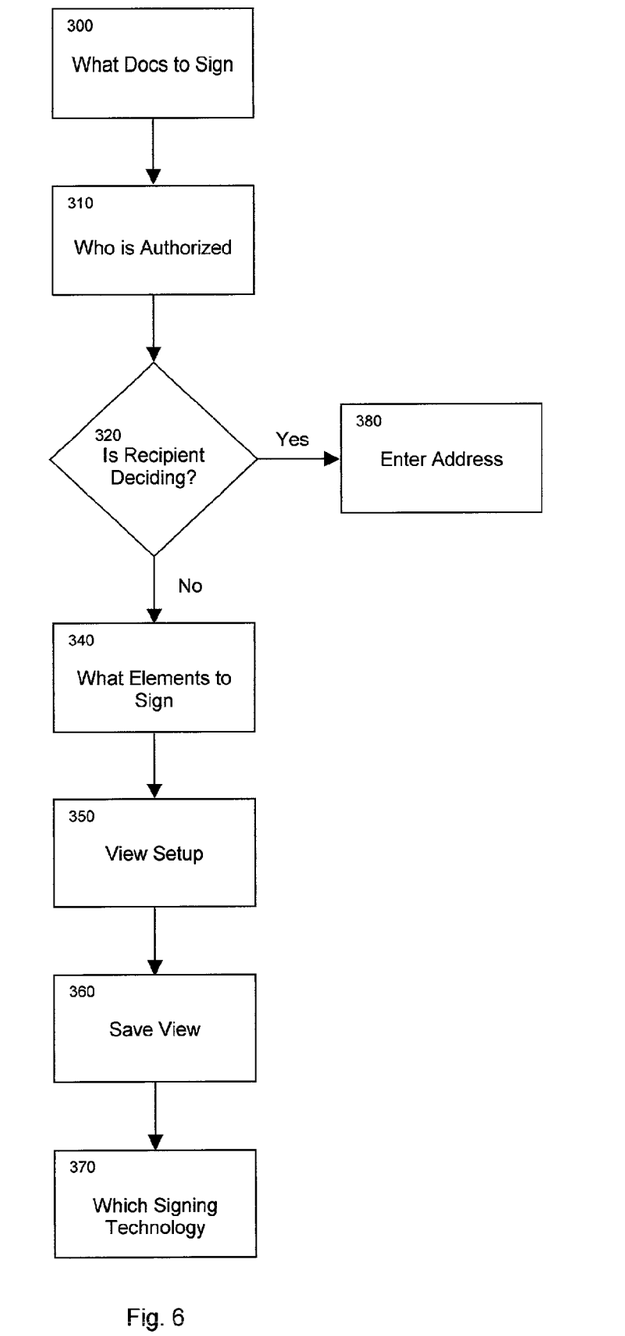
FIG. 6 is a flow chart of the tasks a marketplace integrator undertakes to program the generic security service according to an embodiment of the present invention.

FIG. 6 shows a flow chart depicting the process undertaken by an electronic marketplace integrator to program the generic security service to operate as desired according to an embodiment of the present invention. In step 300, an integrator is asked what types of documents destined for a particular service, for example, require a signature. This can be done by presenting the integrator with a screen that lists various types of documents, for example. The integrator would then indicate which documents should be signed. For example, a payment request may require a signature, while other documents may not.

In step 310, the integrator may indicate who is authorized to sign a particular document type. This can be done by names or other identification of particular users or through different classes of user.

The integrator may then be asked in step 320 if the recipient will be providing any user-friendly representation of the document or a representation to actually be signed of the specific document-type requiring signature. If the recipient is, the recipient address is entered in step 330.

In step 340, if the integrator is setting up any of the representations, the integrator decides which data elements of a document need to be displayed in the representation. The integrator also indicates whether the whole document needs to be signed or, if the intended recipient is not providing the representation to actually be signed, what data elements within the document need to be signed. This could be done once the integrator indicates that a particular document type needs a signature or after the integrator has indicated all of the documents that need signature.

In step 350, an integrator is enabled to create an XSLT template that lays out a user-friendly representation of data elements within a document if one is desired and/or a representation to actually be signed. As mentioned above, electronic documents may contain information that is not easily understood and that may be unimportant to a member. The template can be created, for example, by clicking and dragging data elements to a screen used to set up a comprehensible representation of the document. The integrator can also add text surrounding the data elements to assist in making them comprehensible or to add contractual language. For example, text such as "I (data element) agree to pay $(data element) to (data element)" could be added. This step 350 can be accomplished using either tools provided with generic security service or outside tools. In step 360, a template for the representation created by the integrator is saved. It can be stored in database 31 or in another storage device. This process can be repeated if the integrator is setting up more than one representation of a document.

In step 370, the integrator is asked which electronic signing technology is to be utilized for that particular service. This could be done for that service as a whole or on a document type-by-document type basis. Preferably, the integrator is presented with a list of the signing technologies 61, 62 and 63 existing on the electronic marketplace from which the integrator selects the appropriate one by clicking on it. This information is saved so that when the generic security service is called, it knows which signing technology 61, 62 or 63 to utilize. If the appropriate signing service technology is not yet resident on the electronic marketplace, it must be added prior to it being used.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A computer-implemented method for electronically signing an electronic document, the method comprising:
presenting an electronic document to a user;
receiving an indication from the user as to which data elements, if any, of the document the user wishes to electronically sign;
if the user wishes to sign any data element of the electronic document, determining which of a plurality of electronic signature services is to be used based on user information or the identity of an intended recipient; and
signing the indicated data elements, if any, of the electronic document using the determined electronic signature service.

2. The method of claim 1, wherein presenting the electronic document to the user further comprises:
presenting the electronic document to the user in a first format; and
allowing the user to request presentation of the electronic document in a second format, wherein the second format is determined by the identity of an intended recipient of the electronic document after signature.

3. The method of claim 2, wherein presenting the electronic document to the user further comprises:
selecting one or more data elements from the electronic document; and
displaying the one or more selected data elements in the second format to the user.

4. The method of claim 3, wherein the one or more selected data elements are displayed to the user in the second format with additional text.

5. The method of claim 4, wherein the one or more selected data elements comprise contractual terms and the additional text comprises language of a contract.

6. The method of claim 1, wherein:
the receiving step further comprises allowing the user to indicate that the user wishes to electronically sign the entire document; and
the signing step comprises signing the entire document using the determined electronic signature service if the user indicates that the user wishes to sign the entire document.

7. An electronic signature system, the system comprising:
means for presenting an electronic document to a user;
means for receiving an indication from the user as to which data elements, if any, of the document the user wishes to electronically sign;
if the user wishes to sign any data element of the electronic document, means for determining which of a plurality of electronic signature services is to be used based on user information or the identity of an intended recipient; and
means for signing the indicated data elements, if any, of the electronic document using the determined electronic signature service.

8. The system of claim 7, wherein the means for presenting the electronic document to the user further comprises:
means for presenting the electronic document to the user in a first format; and
means for allowing the user to request presentation of the electronic document in a second format, wherein the second format is determined by the identity of an intended recipient of the electronic document after signature.

9. The system of claim 7, wherein the means for presenting the electronic document to the user further comprises:
means for selecting one or more data elements from the electronic document; and
means for displaying the one or more selected data elements in the second format to the user.

10. The system of claim 9, wherein the one or more selected data elements are displayed to the user in the second format with additional text.

11. The system of claim 10, wherein the one or more selected data elements comprise contractual terms and the additional text comprises language of a contract.

12. The system of claim 7, wherein:
the receiving means further allow the user to indicate that the user wishes to sign the entire document; and
the signing means further provide for signing the entire document using the determined electronic signature service if the user indicates that the user wishes to sign the entire document.

* * * * *